(12) United States Patent
Haefliger et al.

(10) Patent No.: US 6,579,548 B2
(45) Date of Patent: Jun. 17, 2003

(54) METHOD OF MAKING A GRANULAR FOOD PRODUCT

(75) Inventors: Hanspeter Haefliger, Winterthur (CH); Pierre Dupart, Zuerich/Witikon (CH); Leonhard Blasius, Tengen (DE); Peter Kehrli, Winterthur (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/160,011

(22) Filed: Jun. 4, 2002

(65) Prior Publication Data
US 2002/0187224 A1 Dec. 12, 2002

Related U.S. Application Data

(62) Division of application No. 09/575,718, filed on Aug. 2, 2000, now abandoned.

(30) Foreign Application Priority Data

Aug. 3, 1999 (EP) .............................................. 99202546

(51) Int. Cl.⁷ ............................................. A23L 1/2165
(52) U.S. Cl. ............................... 426/96; 98/98; 98/285; 98/589; 98/650
(58) Field of Search ........................... 426/96, 98, 99, 426/285, 650, 589

(56) References Cited

U.S. PATENT DOCUMENTS

| | | | |
|---|---|---|---|
| 3,987,207 A | 10/1976 | Spaeti et al. | 426/99 |
| 4,557,938 A | 12/1985 | Sander et al. | 426/453 |
| 4,692,340 A | 9/1987 | Grutte et al. | 426/72 |
| 4,855,157 A | 8/1989 | Tashiro et al. | 426/96 |
| 5,332,585 A | 7/1994 | Odermatt et al. | 426/96 |
| 5,451,421 A | 9/1995 | Tanihara et al. | 426/589 |
| 5,831,123 A | 11/1998 | Gergely et al. | 426/96 |
| 5,895,676 A | 4/1999 | Thomas | 426/96 |
| 5,916,612 A | 6/1999 | Bonnasse et al. | 426/96 |
| 6,174,554 B1 | 1/2001 | So | 426/96 |

FOREIGN PATENT DOCUMENTS

| | | |
|---|---|---|
| EP | 0 594 152 | 4/1994 |
| EP | 0787 437 | 8/1997 |
| EP | 0954 985 | 11/1999 |
| GB | 998016 | 7/1965 |
| WO | WO 97/16078 | 6/1997 |

OTHER PUBLICATIONS

Japanese patent application 61/224933 (Oct. 1986) abstract.
Japanese patent application 08/131132 (May 1996) abstract.

*Primary Examiner*—Lien Tran
(74) *Attorney, Agent, or Firm*—Winston & Strawn

(57) ABSTRACT

A process for the production of the granular food product by preparing a premix of powdered constituents of the filler and fat, forming the premix into granules or agglomerates by atomizing an aqueous solution of binding agent onto a fluidized bed of the premix to incorporate an amount of binding agent and drying the granules to the desired residual moisture content. The resultant free flowing granular food product comprises a swelling powdered food material having a relatively large mean diameter and a relatively narrow span in diameter distribution so that the granular food product is dispersible by simply pouring it into a hot liquid.

13 Claims, No Drawings

METHOD OF MAKING A GRANULAR FOOD PRODUCT

CROSS-REFERENCE TO RELATED APPLICATION

This application is a divisional of application Ser. No. 09/575,718, filed Aug. 2, 2000, now abandoned, the entire disclosure of which is hereby expressly incorporated herein by express reference thereto.

FIELD OF THE INVENTION

The present invention is directed to methods of making granular food products and the resultant products.

BACKGROUND OF THE INVENTION

Agglomeration has been used in the food industry for a long time to produce agglomerates with improved dispersability from fine powders. The known use of water as agglomerating agent generally is limited to the agglomeration of water soluble particles which after having been wetted stick together forming liquid bridges. During drying the liquid bridges are transformed into stable solid bridges. Furthermore, processing of hygroscopic food powders using water as spraying agent often results in defluidization due to overwetting.

U.S. Pat. No. 4,557,938 to Sander et al. discloses a process for improving the dispersion of a vegetable gum in water. The process comprises dry blending a food grade particulate carrier and vegetable gum particles, fluidizing the mixture with an air stream, intermittently spraying water onto the fluidized bed so that the surfaces of the particles become wet and tacky, resulting in the particles sticking to each other. Subsequently, the process comprises air drying for the time intervals during which no water is sprayed, resulting in the particles becoming bound to each other. The spraying and drying intervals being continued until agglomerated particles are formed.

The present invention provides a mechanically stable, free flowing granular food product having an improved wettability and hot dispersability so that the granular food product may be dispersed while being simply poured into hot water, not provided in the prior art. The present invention also provides a process for the production of a mechanically stable, free flowing granular food product having an improved wettability and hot dispersability so that it may be dispersed while being simply poured into hot water.

SUMMARY OF THE INVENTION

The present invention relates to a granular food product that includes a filler and a high melting fat present in combination in amounts sufficient to impart body and flavor components to the granular food product, with the filler being present in an amount that is greater than that of the high melting fat; and a binding agent present in an amount sufficient to bind the filler and a high melting fat to form the granular food product. Advantageously, the granular food mixture has a mean particle diameter of about 600 $\mu$m to about 1200 $\mu$m, with less than about 3% by volume of particles having a diameter smaller than 200 $\mu$m and a moisture content of about 1% to about 6% by weight of the product.

Preferably, less than about 10% by volume of the particles have a diameter that is smaller than about 300 $\mu$m and less than 10% by volume of the particles have a diameter that is greater than 1900 $\mu$m, and the filler is present in an amount that is about 9 to 45 times as great as the amount of the high melting fat. Also, the granular food product preferably has a span in diameter distribution from about 1 to about 2, a moisture content of between about 3 and 4.5% by weight of the product, and a critical bulk weight that is greater than about 4.3 mm.

The filler is advantageously present in an amount of about 78% to about 92% by weight of the product, and is selected from the group consisting of flour, starch, spices, milk powder, sugar, salt, bouillon masses, extracts, flavorings, fruit powders, and mixtures thereof. The filler is preferably selected from the group consisting of wheat flour, corn flour, soya flour, potato starch, wheat starch, corn starch, spice mixes, vegetable extract, meat extract, yeast extract, spice extract, and mixtures thereof. The binding agent is advantageously present in an amount of about 2% to about 8% by weight of the product, and is selected from the group consisting of a vegetable gum, gum arabic, guar gum, gum carrageenan, and mixtures thereof. The high melting fat is advantageously present in an amount of about 2% to about 10% by weight of the product and is selected from the group consisting of palm fat, beef fat, chicken fat, and mixtures thereof. Preferably, the high melting fat has a melting point temperature of about 45° C. to about 60° C.

The invention also relates to a process for making a granular food product comprising the steps of preparing a premix of at least one filler and at least one high melting fat, wherein the filler is present in an amount that is greater than the amount of high melting fat; forming the premix into a granules or agglomerates having a mean particle diameter of about 600 $\mu$m to about 1200 $\mu$m, with less than about 3% by volume of particles having a diameter smaller than 200 $\mu$m; and drying the granules or agglomerates to form a granular food product.

Preferably, the amount of filler is between about 9 and 45 times as much as that of the fat and a binding agent is added to the premix in an amount sufficient to bind the filler and fat in the agglomerates or granules. Typically, the premix is prepared by mixing powdered constituents including from about 2% to about 10% of a high melting fat and from about 78% to about 92% of a filler by percentage weight of the granular food product. The step of forming the premix into granules or agglomerates generally comprises atomizing an aqueous solution containing about 10% to about 30% of binding agent onto a fluidized bed of the premix until a total amount of about 2% to about 8% by weight of granulated food product is atomized and incorporated into the premix. The aqueous solution of binding agent may be atomized into droplets having a mean diameter of about 40 $\mu$m to about 120 $\mu$m through a binary nozzle under a pressure of from 0.5 to 1.0 bar. The premix may be fluidized by injecting a stream of gas through at least one inlet and into the bottom of a fluidized bed agglomeration tower that contains the premix, wherein the gas has a temperature of about 80° C. to about 120° C. Preferably, the gas is air and the aqueous solution is atomized for about 5 min to about 25 min before the granules are dried for about 1 min to about 10 min. Also, the temperature of the premix during the formation of the granules or agglomerates is about 50° C. to 65° C.

If desired, the granules may be cooled in the tower with an ascending current of air having a temperature of about 10° C. to about 30° C. Also, the step of drying the granules generally is conducted to dry the granules to a residual moisture content of from about 1% to about 6% by weight, and preferably to about 3% to about 4.5% by weight of the granular food product.

The invention also relates to a process for making a granular food product by preparing a premix of at least one filler, at least one high melting fat, and a binding agent, wherein the filler is present in an amount that is greater than the amount of high melting fat and the binding agent is present in an amount sufficient to bind the filler and the fat, atomizing an aqueous solution comprising an amount of the binding agent onto a fluidized bed of the premix so as to form the premix into granules or agglomerates having a mean particle diameter of about 600 μm to about 1200 μm, with less than about 3% by volume of particles having a diameter smaller than 200 μm, and drying the granules or agglomerates to form a free-flowing granular food product that is mechanically stable and easily dispersible in hot water. All of the above process embodiments apply to this aspect of the invention, as well. The invention also relates to granular food products prepared by this process.

DETAILED DESCRIPTION OF THE INVENTION

As used herein, the expression "mechanically stable" means resistant to disintegration during filling and stocking into a pack, particularly into an individual pack.

As used herein, the mean diameter is defined as a 50% limit (D50) in particle distribution whereby 50% by volume of the particles have a diameter below the 50% limit and 50% by volume of the particles have a diameter above the 50% limit.

The outstanding properties of the present granular food product, in so far as it is free flowing and easily dispersible in hot water, may be checked and defined by means of particle size analysis and wettability tests as described herein.

In addition to allowing the production of a granular food product having these outstanding properties, the present process makes it possible to produce the granular food product from hygroscopic powdered food materials. Hygroscopic powdered food materials include, but are not limited to, bouillon masses, extracts, flavorings, fruit powders, or inert powdered food materials including, but not limited to, flours, starches or spice mixes. Preferably, the hygroscopic powdered food materials do not get tacky while being wetted and, after having been agglomerated with water, disintegrate and recover their original powdered form after drying.

Preferably, the granular food product has less than about 10% by volume of the particles have a diameter smaller than about 300 μm and less than about 10% by volume of the particles have a diameter greater than about 1900 μm. More preferably, the granular food product particles have a span in diameter distribution of from about 1 to about 2. As used herein, the term "span" is defined as the broadness or width in particle distribution between a 10% limit (D10) and a 90% limit (D90) divided by the mean particle diameter (D50), whereby 10% by volume of the particles have a diameter below the 10% limit and 10% by volume of the particles have a diameter above the 90% limit.

As used herein, unless otherwise defined, the expression "high melting fat" means a fat having a melting temperature above ambient temperature. Preferably, the high melting fat has a melting temperature of from about 45° C. to about 60° C. The high melting fat may be a vegetable or animal fat, including, but not limited to, palm fat, beef fat, chicken fat, or mixtures thereof.

Typically, the binding agent may be a sugar, polysaccharide, or a mixture thereof. Preferably, the binding agent is a vegetable gum including, but not limited to, gum arabic, guar gum, gum carrageenan, or mixtures thereof.

The filler may be any powdered food material. In particular, the filler is a powdered food material comprising swelling particles, powdered food material or both with a mean particle diameter of which is smaller than about 300 μm. Preferably, the fillers are selected from the group consisting of flour, starch, spices, milk powder, sugar, salt, bouillon masses, an extract, flavorings, fruit powders, and mixtures thereof. More preferably, the filler is selected from the group consisting of wheat flour, corn flour, soya flour, potato starch, wheat starch, corn starch, spice mixes, vegetable extract, meat extract, yeast extract, spice extract, and mixtures thereof.

The process of the present invention for the production of a granular food product comprises the steps of preparing a premix of powdered constituents, forming the premix into granules or agglomerates, and drying the granules.

Preparing the premix comprises mixing powdered constituents of the high melting fat and a filler, preferably where the filler is present in an amount that is much greater than that of the fat. Advantageously, from about 2% to about 10% of high melting fat and from about 78% to about 92% of filler by percentage weight of the granular food product are mixed together. Preferably, the high melting fat is heated to a temperature above its melting point in order to be in liquid form. Mixing of the premix may be carried out by means of any suitable traditional powder mixer, including, but not limited to, a horizontal mixer with plow-shaped heads arranged on a horizontal shaft or a ribbon mixer.

Forming the premix into granules or agglomerates typically comprises atomizing an aqueous solution containing about 10% to about 30% of binding agent onto a fluidized bed of the premix until a total amount of from about 2% to about 8% of binding agent, by weight of granular food product, has been atomized and incorporated therein.

Forming the premix into granules or agglomerates by atomizing a solution of binding agent onto a fluidized bed of the premix may be carried out in any batch fluidized bed agglomeration equipment of the food industry. The equipment generally consists of a tower. In the lower part of the tower, the premix is fluidized by a stream of gas injected through one or more gas inlets provided for at or near the bottom of the tower. In a middle part of the tower, the solution of binding agent may be atomized into the fluidized bed through an adequate nozzle including, but not limited to, a binary nozzle. In an upper part of the tower, the gas used for fluidizing and/or heating or cooling the product is filtered before escaping through one or more exhaust pipes provided for at or near the top of the tower.

It has been found that the present process allows the powdered constituents of the premix to be formed into granules or agglomerates having both a relatively large mean diameter and a relatively narrow span in diameter distribution, by making the particles of powdered constituents tacky rather than wet before the particles enter into collision with each other so that they actually adhere and remain adhered to each other after collision.

In a preferred embodiment, an agglomerate may be formed by atomizing droplets of an aqueous solution of binding agent in such a way that they arrive in a nearly dry state, namely in a very thick and sticky state onto the particles so that the particles immediately get very tacky. Thus, if the premix is formed into granules or agglomerates by atomizing an aqueous solution containing less than about 10% of binding agent, there is a risk that the premix of powdered constituents gets too wet and not tacky enough. Alternatively, if the premix is formed into granules or agglomerates by atomizing an aqueous solution containing more than about 30% of binding agent, there is a risk of lack of efficiency due to too high a viscosity of the solution.

The present process preferably comprises fluidizing the premix with an ascending current of air having a relatively high temperature of from about 80° C. to about 120° C. More preferably, the present process comprises atomizing the aqueous solution of binding agent in form of droplets having a relatively large mean diameter of from about 40 μm to about 120 μm. One method to obtain this size is by atomizing the aqueous solution of binding agent through a binary nozzle under a relatively low pressure of from about 0.5 about 1 bar, and preferably at a pressure of about 0.7 to 0.9 bar.

Preferably, the temperature of the product during agglomeration is from about 50° C. to about 65° C. If the temperature of the product during agglomeration is less than about 50° C., there is a risk that the premix of powdered constituents gets too wet and not tacky enough. If the temperature of the product during agglomeration is greater than about 65° C., there is a risk that the premix of powdered constituents dries before it is agglomerated.

The agglomeration process may be carried out in a relatively short time. Preferably, the aqueous solution is atomized for about 5 min to about 25 min and the granules are dried for about 1 min to 10 min. The granules may then be cooled with an ascending current of air having a temperature of from about 10° C. to about 30° C.

Drying may be carried out using any conventional methods. One of ordinary skill in the art with little or no experimentation can easily determine the appropriate drying methods for a particular granular food product. Typically, the granules are dried to a residual moisture content of from about 1% to about 6%, preferably to a residual moisture content of from about 3% to about 4.5% by weight of the granular food product.

Embodiments of the granular food product and of the process for producing the granular food product according to the present invention are illustrated in the following non-limiting examples in which the percentages are by weight of the granular food product unless indicated to the contrary.

EXAMPLES

Certain embodiments of the invention, as well as certain novel and unexpected advantages of the invention are illustrated by the following non-limiting examples. The Examples are preceded by a short description of methods used for defining some of the properties of the granular food product thus obtained.

Method 1

Particle Size Analysis

The particle size of the granular food product was measured by means of a laser diffraction particle sizer (MASTERSIZER S, Malvern Instruments Ltd., Malvern/GB), coupled with a fully automated, air pressure controlled dry powder feeder (GMP ultra). The relative distribution of volume of the particles in the range of size classes. Cumulative undersize curves and the following particle size distribution parameters were derived from these basic results:

D50: 50% limit = mean particle diameter (50% by volume of the particles had a diameter below D50 and 50% by volume of the particles had a diameter above D50)
D03: 3% limit (3% by volume of the particles had a diameter below D03)
D10: 10% limit (10% by volume of the particles had a diameter below D10)
D90: 90% limit (10% by volume of the particles had a diameter above D90)
Span: (D90-D10)/D50

Method 2

Wettability Test

The wettability of granules or agglomerates, namely the ability of a liquid to penetrate into the pore structure of granules or agglomerates owing to capillarity is the key point in the overall reconstitution of instant soups and sauces. Wettability is evaluated by determining a "critical bulk height" for complete wetting of the present granular food product. To this end, the granular product is loaded into a flat, cylindrical immersion cell whose bottom consists of a coarse sieve with a mesh size of 0.2 mm. With the aid of a conical insert having an angle α of 14° the product is distributed as a shell-hole within the cell. The cell is immersed into hot water at 75° C. The critical bulk height for complete wetting is defined to be the height of the product at the side of a circular, wetted central portion of the product distributed as a shell-hole in the cell. The critical bulk height is determined as the product (tgα)(radius r of the wetted circle).

A comparison of granular products having different wettabilities and hence different critical bulk heights allowed Table 1. Based on the results of these measurements, it may be said that a granular product, especially the present granular food product has a good wettability if its critical bulk height as determined with the above test is greater than about 4.3 mm.

TABLE 1

| Critical bulk height (mm) | Interpretation of results |
|---|---|
| >4.3 | good wettability in hot water due to high powder porosity and increased particle size, i.e. the wetting phase during reconstitution is completed before a swelling of particles clogs the powder pores and stops capillary liquid transport |
| 3.0–4.3 | medium wettability, i.e. the wetting process is rather slow due to a low powder porosity and a broad particle size distribution; risks of lump formation |
| <3.0 | insufficient wettability, lump formation |

Example 1

Granular Food Product According to the Invention

A granular food product in form of a hot dispersible, instant mushroom soup was produced by means of an equipment comprising an AES 5.5 type AEROMATIC-FIELDER standard batch fluidized bed agglomerator the atomizing nozzle of which was a 942-7 type SCHLICK two fluids (binary) nozzle having a central, outlet orifice 1.8 mm in diameter.

To this end a premix of powdered constituents was prepared in a horizontal mixer with plow-shaped heads arranged on its horizontal shaft, which had the following composition, in % by total weight of premix plus binding agent:

| Ingredient | Amount |
|---|---|
| modified corn starch | 28.9 |
| sodium chloride | 10.5 |
| native potato starch | 10.7 |
| sodium glutamate | 2.9 |
| protein hydrolysate based, powdered aromatizing agent | 14.4 |
| mushroom powder | 9.2 |
| onion powder | 2.1 |
| spices | 3.2 |
| skim milk powder | 4.5 |
| palm fat | 6.4 |

A batch of 6 kg of this premix was fluidized in the equipment with an ascending current of air having an inlet temperature of 103° C. 2400 g of a 20% aqueous solution of gum arabic were atomized under an atomizing pressure of 0.9 bar for 8 min on the fluidized premix the temperature of which was 52° C. The temperature of the air escaping from the top of the equipment was 49° C. The agglomerated food product was then dried for 1.5 min with the ascending current of air still having an inlet temperature of 103° C. The agglomerated food product was then cooled with an ascending current of air having an inlet temperature of 27° C.

The granular food product, namely the hot dispersible, instant mushroom soup thus obtained comprised 7.2% of gum arabic and had a residual water content of 4.4%. It was packaged in individual packs or pouches in metallized PET/PE. The instant mushroom soup could be poured from a just opened package into hot water at 85° C. wherein it dispersed within 7 sec without leaving any residue or sediment. The mushroom soup had the properties indicated in Table 2 hereafter:

TABLE 2

| Parameter | Granular food product of Example 1 | Water aggl. product of Comparative example (1a) |
|---|---|---|
| D03 ($\mu$m) | 250 | 70 |
| D10 ($\mu$m) | 460 | 138 |
| D50 ($\mu$m) | 968 | 373 |
| D90 ($\mu$m) | 1700 | 930 |
| Span (−) | 1.28 | 2.12 |
| critical bulk height | 4.79 | 2.25 |
| mechanical stability | fair | low |

Table 2 illustrates the fact that the particle size of the present granular food product obtained in Example 1 was notably bigger and its span in diameter distribution was notably lower than the ones of a water agglomerated product obtained as disclosed in Comparative example (1a) hereafter, so that its dispersability in hot water also was considerably better, what was confirmed by its relatively high critical bulk height.

Comparative Example 1A

An agglomeration process was carried out in the way disclosed in Example 1 except for the fact that the premix was fluidized in the equipment with an ascending current of air having an inlet temperature of 50° C., 2000 g of water were atomized under an atomizing pressure of 4.0 bar (through a binary nozzle having a central outlet orifice 1.5 mm in diameter) for 10 min onto the fluidized premix the temperature of which progressively diminished from 35° C. to 27° C., the temperature of the air escaping from the top of the equipment was 36° C., the agglomerated food product was dried for 24 min with the ascending current of air having an inlet temperature of 85° C., and the water agglomerated product was then cooled with an ascending current of air having an inlet temperature of 27° C.

The water agglomerated product obtained in this way was packaged in individual packs or pouches in metallized PET/PE. When poured from a just opened package into hot water at 65° C., the water agglomerated product did not disperse therein even within more than 60 sec and it left therein a substantial amount of residue or sediment. The water agglomerated product had the properties indicated in Table 2 above.

Example 2

Granular Food Product According to the Invention

A granular food product in form of a hot dispersible, instant beef bouillon was produced by means of an equipment comprising an AES 5.5 type AEROMATIC-FIELDER standard batch fluidized bed agglomerator the atomizing nozzle of which was a 942-7 type SCHLICK two fluid (binary) nozzle having a central, outlet orifice 1.8 mm in diameter.

To this end a premix of powdered constituents was prepared in a horizontal mixer with plow-shaped heads arranged on its horizontal shaft, which had the following composition, in % by total weight of premix plus binding agent:

| Ingredients | Amount |
|---|---|
| sugar | 3.9 |
| sodium chloride | 3.9 |
| native potato starch | 7.0 |
| sodium glutamate | 5.8 |
| yeast extract | 3.4 |
| beef flavors and other protein hydrolysate based powdered aromatizing agents | 21.2 |
| spices | 4.1 |
| visible ingredients (garnishes) | 6.9 |
| maltodextrin | 30.9 |
| beef fat | 9.6 |

A batch of 6 kg of this premix was fluidized in the equipment with an ascending current of air having an inlet temperature of 118° C. 1000 g of a 20% aqueous solution of gum arabic were atomized under an atomizing pressure of 0.8 bar for 8 min on the fluidized premix the temperature of which was 50° C. The temperature of the air escaping from the top of the equipment was 49° C. The agglomerated food product was then dried for 2.0 min with the ascending current of air having an inlet temperature of 114° C. The agglomerated food product was then cooled with an ascending current of air having an inlet temperature of 26° C.

The granular food product, namely the hot dispersible, instant beef bouillon thus obtained comprised 3.3% of gum arabic and had a residual water content of 3.8%. It was packaged in individual packs or pouches in metallized PET/PE. The instant beef bouillon could be poured from a just opened package into hot water at 85° C. wherein it dispersed within 6.5 sec without leaving any residue or sediment. The beef bouillon had the properties indicated in Table 3 hereafter:

TABLE 3

| Parameter | Granular food product of Example 4 | Water aggl. Product of Comparative example (4a) |
|---|---|---|
| D03 (μm) | 200 | 85 |
| D10 (μm) | 347 | 115 |
| D50 (μm) | 873 | 278 |
| D90 (μm) | 1718 | 762 |
| Span (−) | 1.57 | 2.21 |
| critical bulk height | 4.82 | 2.85 |
| Mechanical stability | fair | low |

Table 3 illustrates the fact that the particle size of the present granular food product obtained in Example 2 was notably bigger and its span in diameter distribution was notably lower than the ones of a water agglomerated product obtained as disclosed in Comparative example (2a) hereafter, so that its dispersability in hot water also was considerably better, what was confirmed by its relatively high critical bulk height.

Comparative Example 2A

An agglomeration process was carried out in the way disclosed in Example 2 except for the fact that the premix was fluidized in the equipment with an ascending current of air having an inlet temperature of 27° C., 350 g of water were atomized under an atomizing pressure of 3.0 bar (through a binary nozzle having a central outlet orifice 1.5 mm in diameter) for 4 min onto the fluidized premix the temperature of which progressively diminished from 27° C. to 24° C., the temperature of the air escaping from the top of the equipment was 28° C., the agglomerated food product was dried for 11 min with the ascending current of air having an inlet temperature of 103° C., and the water agglomerated product was then cooled with an ascending current of air having an inlet temperature of 24° C.

The water agglomerated product obtained in this way was packaged in individual packs or pouches in metallized PET/PE. When poured from a just opened package into hot water at 75° C., the water agglomerated product did not disperse therein even within more than 60 sec and it left therein an important residue or sediment. The water agglomerated product had the properties indicated in Table 3 above.

The term "about," as used herein, should generally be understood to refer to both numbers in a range of numerals. Moreover, all numerical ranges herein should be understood to include each number within the range and amounts "greater than" and "less than" the numbers.

Although preferred embodiments of the invention have been described in the foregoing Detailed Description, it will be understood that the invention is not limited to the embodiments disclosed, but is capable of numerous rearrangements and modifications of parts and elements without departing from the spirit of the invention. It will be understood that the chemical and/or mechanical details of every design may be slightly different or modified by one of ordinary skill in the art without departing from the teachings of the present invention.

What is claimed is:

1. A process for making a granular food product which comprises:
    preparing a premix of at least one filler, at least one high melting fat, and a binding agent, wherein the filler is present in an amount that is greater than the amount of high melting fat and the binding agent is present in an amount sufficient to bind the filler and the fat;
    atomizing an aqueous solution comprising an amount of the binding agent onto a fluidized bed of the premix so as to form the premix into granules or agglomerates having a mean particle diameter of about 600 μm to about 1200 μm, with less than about 3% by volume of particles having a diameter smaller than 200 μm; and
    drying the granules or agglomerates to form a free-flowing granular food product that is mechanically stable and easily dispersible in hot water.

2. The process of claim 1 wherein the amount of filler is from about 9 to 45 times as much as that of the fat.

3. The process of claim 1, wherein the premix is prepared by mixing powdered constituents including from about 2% to about 10% of a high melting fat and from about 78% to about 92% of a filler by percentage weight of the granular food product.

4. The process of claim 3, wherein the aqueous solution of binding agent comprises about 10% to about 30% of the binding agent.

5. The process of claim 1, wherein the atomizing provides a total amount of about 2% to about 8% by weight of granulated food product incorporated into the premix.

6. The process of claim 1, wherein the aqueous solution of binding agent is atomized into droplets having a mean diameter of about 40 μm to about 120 μm through a binary nozzle under a pressure of from 0.5 to 1.0 bar.

7. The process of claim 1, wherein the premix is fluidized by injecting a stream of gas through at least one inlet and into the bottom of a fluidized bed agglomeration tower that contains the premix, wherein the gas has a temperature of about 80° C. to about 120° C.

8. The process of claim 7, wherein the gas is air and the aqueous solution is atomized for about 5 min to about 25 min before the granules are dried for about 1 min to about 10 min.

9. The process of claim 1, wherein the temperature of the premix during the formation of the granules or agglomerates is about 50° C. to 65° C.

10. The process of claim 1, which further comprises cooling the granules with an ascending current of air having a temperature of about 10° C. to about 30° C.

11. The process of claim 1, wherein drying the granules comprises drying the granules to a residual moisture content of from about 1% to about 6% by weight of the granular food product.

12. The process of claim 11, wherein the granules are dried to a residual moisture content of about 3% to about 4.5% by weight of the product.

13. A process for making a granular food product which comprises:
    preparing a premix of at least one filler, at least one high melting fat, and a binding agent, wherein the filler is present in an amount that is greater than the amount of high melting fat and the binding agent is present in an amount sufficient to bind the filler and the fat;
    atomizing an aqueous solution comprising an amount of the binding agent onto a fluidized bed of the premix so as to form the premix into granules or agglomerates having a mean particle diameter of about 600 μm to about 1200 μm, with less than about 3% by volume of particles having a diameter smaller than 200 μm, wherein the premix is fluidized using gas; and
    drying the granules or agglomerates to form a free-flowing granular food product that is mechanically stable and easily dispersible in hot water.

* * * * *